United States Patent [19]
Fredley

[11] Patent Number: 5,998,058
[45] Date of Patent: Dec. 7, 1999

[54] POROUS SUPPORT LAYER FOR AN ELECTROCHEMICAL CELL

[75] Inventor: Robert Raymond Fredley, Tolland, Conn.

[73] Assignee: International Fuel Cells Corporation, South Windsor, Conn.

[21] Appl. No.: 09/067,882

[22] Filed: Apr. 29, 1998

[51] Int. Cl.⁶ .................................................. H01M 4/86
[52] U.S. Cl. ................ 429/44; 429/40; 429/41; 429/42; 429/245; 204/296; 29/592.1
[58] Field of Search .................. 429/40, 41, 42, 429/44, 245; 204/296; 29/592.1

[56] References Cited

U.S. PATENT DOCUMENTS

| | | | |
|---|---|---|---|
| 3,457,113 | 7/1969 | Deibert | 136/86 |
| 3,905,832 | 9/1975 | Trocciola | 136/86 |
| 4,038,463 | 7/1977 | Lamarine et al. | 429/44 |
| 4,345,008 | 8/1982 | Breault | 429/26 |
| 4,826,742 | 5/1989 | Reiser | 429/33 |
| 5,480,735 | 1/1996 | Landsman et al. | 429/13 |
| 5,620,807 | 4/1997 | Mussell et al. | 429/33 |

*Primary Examiner*—Aaron S. Phasge
*Attorney, Agent, or Firm*—Malcolm J. Chisholm, Jr.

[57] ABSTRACT

An improved porous support layer is disclosed for use in an electrochemical cell such as a fuel cell having a proton exchange membrane ("PEM") as an electrolyte. In a preferred embodiment the porous support layer is positioned near and in fluid communication with an electrode to facilitate fluid transport to and away from each electrode. Each such porous support layer includes hydrophobic pores and hydrophilic pores integrated throughout the layer, wherein the hydrophobic pores are coated with a hydrophobic substance and include about 75 percent to about 95 percent of the total pore volume of the porous support layer, and the hydrophilic pores comprise about 25 percent to about 5 percent of the total pore volume of the porous support layer. The hydrophobic pores of the porous support layers facilitate gas transfer and restrict liquid water absorption into the hydrophobic pores, while the hydrophilic pores facilitate simultaneous liquid water transport through the layers. A method of manufacture of the porous support layer includes the steps of filling about 25 percent to about 5 percent of the pore volume of a carbon fiber substrate layer with a blocking material; applying a hydrophobic substance to the remaining, unfilled pore volume of the substrate layer; and heat treating the dried substrate at a temperature adequately high to volatilize or decompose the blocking material and fuse the hydrophobic substance to coat the hydrophobic pores to produce the porous support layer.

16 Claims, 3 Drawing Sheets

POROUS SUPPORT LAYER FOR AN ELECTROCHEMICAL CELL

TECHNICAL FIELD

The present invention relates to electrochemical cells such as stacks of electrochemical cells used in fuel or electrolysis cells, and especially relates to a fuel cell having improved fluid transport.

BACKGROUND OF THE INVENTION

Electrochemical cells are commonly used in a fuel cell configuration to produce electrical energy from reducing and oxidant fluids, or in an electrolysis cell configuration to produce product gases from a supply fluid such as producing hydrogen and oxygen gas from water. Typical applications employ a plurality of planar cells arranged in a stack surrounded by an electrically insulating frame that defines manifolds for directing flow of reactant and product fluids. Electrochemical cells generally include an anode electrode and a cathode electrode separated by an electrolyte. Enhancing uniformity of distribution and rates of transport of reducing and product fluids from surfaces of the electrodes and throughout the cells increases operating efficiencies of electrochemical cells.

For example, a well-known use of such electrochemical cells is in a stack for a fuel cell that uses a proton exchange membrane (hereafter "PEM") as the electrolyte. In such a cell, a reactant or reducing fluid such as hydrogen is supplied to the anode electrode, and an oxidant such as oxygen or air is supplied to the cathode electrode. The hydrogen electrochemically reacts at a surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. The PEM electrolyte consists of a solid polymer well-known in the art. Another common electrolyte used in fuel cells includes phosphoric acid or potassium hydroxide held within a porous, non-conductive matrix between the anode and cathode electrodes. It has been found that PEM cells have substantial advantages over cells with acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention. As is well-known however, PEM cells have significant limitations especially related to liquid water transport to, through and away from the PEM, and related to simultaneous transport of gaseous reducing and oxidant fluids to and from the electrodes adjacent opposed surfaces of the PEM. The prior art includes many efforts to minimize the effect of those limitations.

In operation of a fuel cell employing a PEM, the membrane is saturated with water, and the anode electrode adjacent the membrane must remain wet. As hydrogen ions produced at the anode electrode transfer through the electrolyte, they drag water molecules in the form of hydronium ions with them from the anode to the cathode. Water also transfers back to the anode from the cathode by osmosis. Product water formed at the cathode electrode is removed by evaporation or entrainment into a circulating gaseous stream of oxidant, or by capillary action into and through a porous fluid transport layer adjacent the cathode. Porous water transport plates supply liquid water from a supply of coolant water to the anode electrode and remove water from the cathode electrode returning it back to the coolant water supply, as well as serving to remove heat from the electrolyte and electrodes. It is critical that a proper water balance be maintained between a rate at which water is produced at the cathode electrode and rates at which water is removed from the cathode and at which liquid water is supplied to the anode electrode. An operational limit on performance of such a PEM fuel cell is defined by an ability of the cell to maintain the water balance as electrical current drawn from the cell into the external load circuit increases. If insufficient water is returned to the anode electrode, adjacent portions of the PEM electrolyte dry out thereby decreasing the rate at which hydrogen ions may be transferred through the PEM and also resulting in cross-over of the reactant fluid leading to local over heating. Similarly, if insufficient water is removed from the cathode, the cathode electrode may become flooded effectively limiting oxidant supply to the cathode and hence decreasing current flow.

Fuel cell development has endeavored to enhance fluid transport throughout a cell and to thereby decrease weight and cost requirements to meet specific operating demands. For example, in a typical fuel cell the anode and cathode electrodes comprise thin, porous catalyst layers supported by porous support layers in intimate contact with opposed major surfaces of an electrolyte such as a PEM. Water, reducing and oxidant fluids move to, through and away from the catalyst layers through the pores of the support layers. In order to prevent liquid water from blocking movement of gaseous fluids through the support layer pores, it is known to treat the support layer with hydrophobic substances such as hydrophobic polymers. Such a hydrophobic support layer facilitates transport of gaseous oxidizing, reducing and product fluids, while water moves through the support layer as vapor or "percolates" through the layer as a liquid. Additionally, to minimize excess accumulation of liquid water at the cathode thereby restricting access of the gaseous oxidant to the cathode electrode, it is also known to use porous, carbonized, wetproofed sheets adjacent the cathode, as shown in U.S. Pat. No. 4,826,742 to Reiser that issued on May 2, 1989 and is assigned to the assignee of the invention disclosed herein. Further fuel cell development includes use of hydrophobic substances integrated within a catalyst layer on a porous support layer in an alkaline electrolyte fuel cell to establish a network of hydrophobic gas passages communicating with the catalyst particles making up the electrode and simultaneous use of hydrophilic catalytically inactive particles within the same catalyst layer to form liquid transport pathways, as shown in U.S. Pat. No. 5,480,735 to Landsman et al. that issued on Jan. 2, 1996 and is assigned to the assignee of the present invention. Improvements in liquid electrolyte fuel cells also include disclosure of a plurality of impregnations of hydrophobic materials in hydrophilic porous support layers adjacent electrode surfaces shown in U.S. Pat. No. 4,038,463 to Lamarine et al. that issued on Jul. 26, 1977, and creation of hydrophilic electrolyte reservoirs uniformly distributed throughout a surface of hydrophilic porous support layers by partially masking the support layer prior to application of a hydrophobic polymer and thereafter removing the masking material, as shown in U.S. Pat. No. 3,905,832 to Trocciola, both of which patents are assigned to the assignee of the present invention.

It is also known to add porous water transport plates adjacent the support layers to facilitate liquid water transport and cooling throughout the cell; to integrate a humidifying component to add moisture to the gaseous reducing or oxidant fluids entering the cell to limit a possibility of drying out of the electrodes and an adjacent PEM; to integrate a condensing loop external to the cell to condense moisture within an exiting oxidant stream such as by a heat exchange relationship with ambient air and to then return the condensed moisture to the porous support layers adjacent the anode electrode; to render a portion of a phosphoric acid electrolyte electrochemically inactive in a phosphoric acid cell and thereby form a condensation zone adjacent an oxidant gas outlet which zone operates at a cooler temperature than the active portions of the electrolyte to thereby limit electrolyte loss (as shown in U.S. Pat. No. 4,345,008 to Breault and assigned to the assignee of the present invention); and to generate a pressure differential on the anode side of the cell wherein the reacting gases are maintained at a slightly higher pressure than coolant water and anode supply water passing through porous support layers adjacent reducing gas distribution channels so that the pressure differential assists water transport through the porous support layers and cell.

These improvements have significantly enhanced fuel cell operating efficiencies. However, PEM fuel cells in particular still suffer operational limits related to fluid transport capacities of specific cell components. To restrict liquid water accumulation within pores of porous support layers, the layers are often uniformly treated with hydrophobic substances or "wetproofed", thereby restraining liquid water transport through the pores of the wetproofed support layers. Maximum operational capacity of a fuel cell however should provide a porous support layer that enables some liquid water transport through the support layer simultaneous with transport of gaseous materials through the same layer. Accordingly, there is a need for a porous support layer for use in an electrochemical cell such as a PEM fuel cell that enhances gaseous and liquid fluid transport through the layer without permitting flooding of the layer with liquid water.

DISCLOSURE OF THE INVENTION

An improved porous support layer is disclosed for use in an electrochemical cell such as a fuel cell for efficiently producing electrical energy from reducing and oxidant fluids. In a preferred embodiment, the porous support layer is used in a fuel cell that includes as an electrolyte a proton exchange membrane ("PEM") having opposed first and second major surfaces, an anode electrode supported in intimate contact with the first major surface and a cathode electrode supported in intimate contact with the second major surface. A porous support layer is positioned near and in fluid communication with each electrode to facilitate fluid transport to and away from each electrode. Each such porous support layer includes hydrophobic pores and hydrophilic pores integrated throughout the layer, wherein the hydrophobic pores are coated with a hydrophobic substance. In a further preferred embodiment, the hydrophobic pores comprise between about 75 percent to about 95 percent of the total pore volume of the porous support layer, and the hydrophilic pores comprise about 25 percent to about 5 percent of the total pore volume of the porous support layer. In use of a fuel cell using the improved porous support layers positioned within the cell in fluid communication with the anode and cathode electrodes, a gaseous reducing fluid such as hydrogen and liquid water are directed into a first porous support layer on the anode side of the PEM, while a gaseous oxidant such as oxygen or air is directed into the porous support layer on the cathode side of the PEM. An electrical potential is generated by the electrodes which drives an electric current out of the cell through and external load circuit in a well-known manner. The hydrophobic pores of the porous support layers facilitate gas transfer and restrict liquid water absorption into the hydrophobic pores, while the hydrophilic pores facilitate liquid water transport through the layers. In the event of an increased current demand by the external load, such as an accelerating transport vehicle, an increased amount of water will be formed at the cathode electrode, while simultaneously an increased amount of liquid water is removed away by "proton drag" from the anode electrode through the PEM to the cathode electrode. If the gaseous oxidant supplied to the cathode electrode through the porous support layer on the cathode side of the cell is saturated with water vapor, liquid water will accumulate at the cathode electrode to be removed from the cathode through the hydrophilic pores of the porous support layer. Similarly, if the gaseous reactant supplied through the porous support layer on the anode side of the PEM is not saturated with water vapor, additional liquid water can be supplied to the anode electrode through the hydrophilic pores of the porous support layer to prevent dry out of the PEM.

A method of manufacture of the porous support layer that enhances fluid transport throughout the cell is also disclosed. The method includes the steps of filling between about 25 percent to about 5 percent of the pore volume of a carbon fiber substrate layer with a blocking material such as a liquid wax; solidifying the wax; applying a hydrophobic substance to the remaining unfilled pore volume which represents between about 75 percent to about 95 percent of the pore volume of the substrate layer; drying the substrate layer at a temperature below a melting temperature of the wax to remove any liquid carrier of the hydrophobic substance; heat treating the dried substrate at a temperature adequately high to volatilize the wax and fuse the hydrophobic substance to coat the hydrophobic pores to produce the porous support layer.

Accordingly, it is a general object of the present invention to provide a porous support layer for use in an electrochemical cell such as a fuel cell that overcomes deficiencies of prior art support layers.

It is a more specific object to provide a porous support layer that facilitates simultaneous transport of gaseous and liquid fluids throughout a fuel cell.

It is yet another specific object to provide a porous support layer that may be utilized on either an anode or cathode side of a fuel cell.

These and other objects and advantages of this invention will become more readily apparent when the following description is read in conjunction with the accompanying drawings.

DESCRIPTION OF THE PREFERRED EMBODIMENTS

Figure 1:
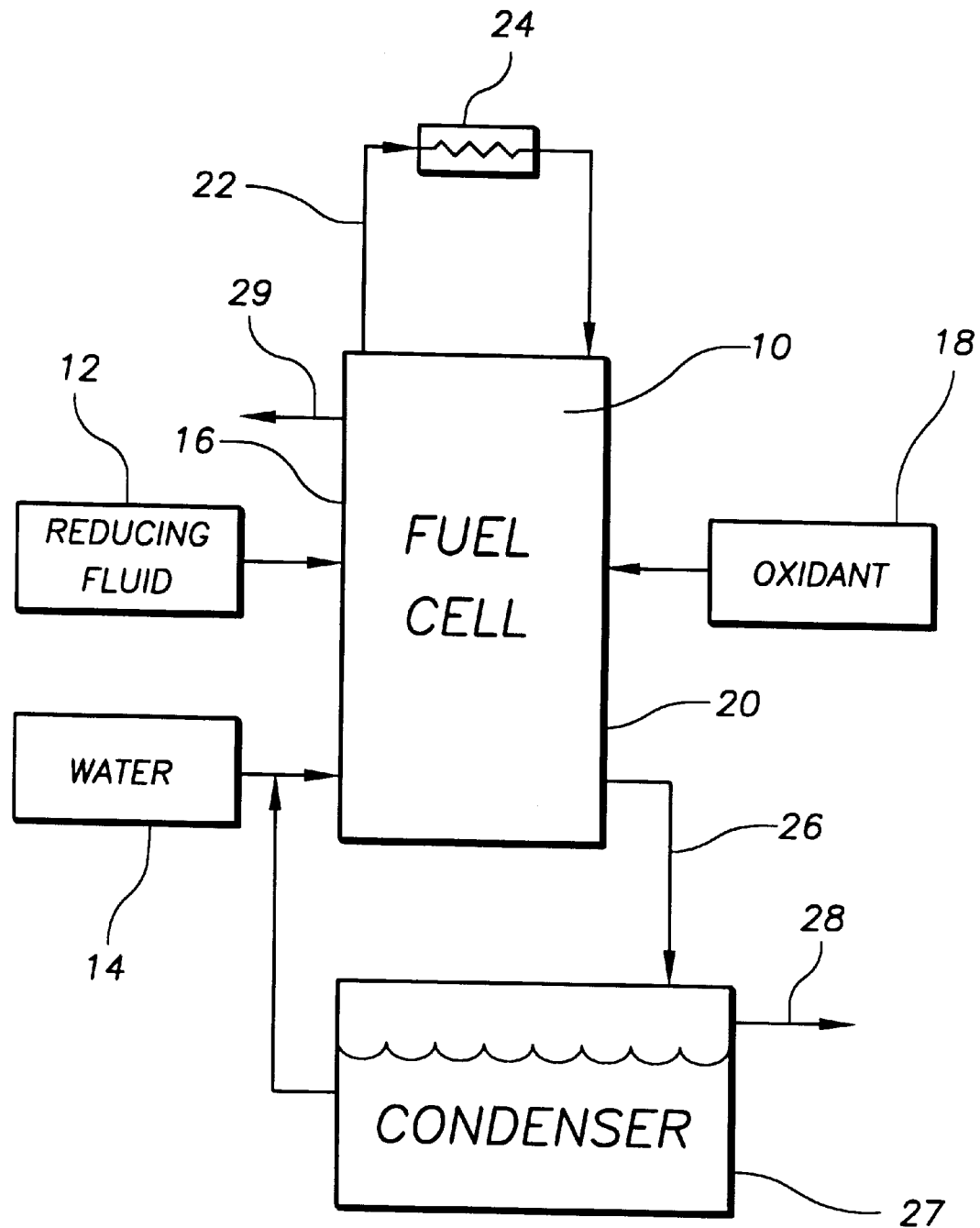
FIG. 1 is a schematic representation of operation of a fuel cell to produce electricity.
Figure 2:
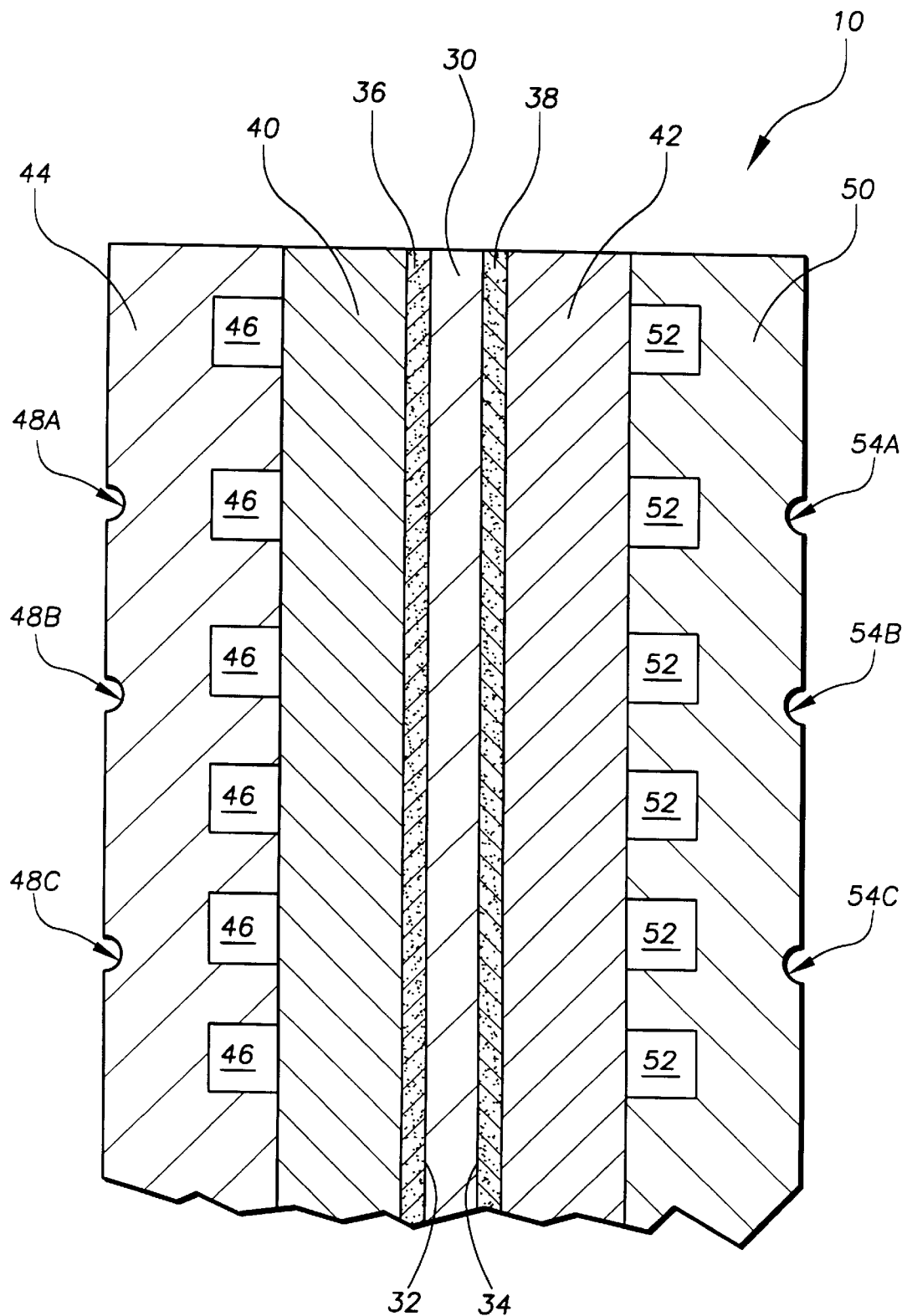
FIG. 2 is a schematic cross-section of a fuel cell employing the improved porous support layer of the present invention.

Referring to the drawings in detail, an electrochemical cell such as a fuel cell represents the most common working environment of the present invention, and is best shown schematically in FIG. 2, as generally designated by the reference numeral 10. FIG. 1 schematically show a general and well-known operation of such a fuel cell 10, wherein a reducing fluid 12 such as hydrogen or a reformed hydrocarbon derived from methane or gasoline and water 14 are directed to an anode side 16 of the fuel cell 10, while an oxidant 18 such as oxygen or air is directed to a cathode side 20 of the cell 10. The reducing fluid 12 electrochemically reacts in a well-know manner to produce protons and electrons, wherein the electrons flow from the anode side 16 through an external load circuit 22 to power an electricity using device 24, such as a transport vehicle, and the protons travel through the cell to the cathode side 20. The electrons then flow through the circuit 22 to the cathode side 20 of the fuel cell to react with the oxidant 18 to form water and heat. Where the fuel cell 10 is a component of a system powering a transport vehicle (shown schematically at reference numeral 24), it is important to minimize water loss from the cell. Therefore water formed at the cathode side 20 of the system and any water supplied to the anode side 16 that is dragged through the cell to the cathode side 20 that is not used to cool the cell 10 is directed back to the anode side 16 through a water recycle line 26 that may include a condensing heat exchanger 27. Unused oxidant is directed out of the heat exchanger through an oxidant discharge vent 28, and unused reducing fluid is directed out of the fuel cell 10 through a reducing fluid discharge vent 29. Typically the fuel cell 10 is arranged with a plurality of similar cells in a stack that includes a frame (not shown) having manifold and related means for directing flow of reducing, oxidant, and cooling fluids and electricity in a well-known manner.

As best shown in FIG. 2, the fuel cell 10 of the present invention includes an electrolyte such as a proton exchange membrane ("PEM") 30, having a first major surface 32 and an opposed second major surface 34. An anode electrode 36 is supported in intimate contact with the first major surface 32 of the PEM, and a cathode electrode 38 is similarly supported in intimate contact with the second major surface 34 of the PEM. A first improved porous support layer 40 of the present invention is secured adjacent the anode electrode 36 and a second improved porous support layer 42 is secured adjacent the cathode electrode 38. A first water transport plate 44 is secured adjacent the first porous support layer 40 and the first water transport plate 44 defines a first gas distribution network 46, and a plurality of first feed water channels 48A, 48B, 48C. A second water transport plate 50 is secured adjacent the second porous support layer 42 and defines a second gas distribution network 52 and a plurality of second feed water channels 54A, 54B, 54C.

The first and second porous support layers 40, 42 each include a substrate defining hydrophilic pores and hydrophobic pores integrated throughout the substrate, wherein the hydrophobic pores are coated with a hydrophobic substance. By the phrase "integrated throughout the substrate", it is meant that the hydrophobic and hydrophilic pores are distributed randomly throughout the layer and are not separated from each other by any defined boundaries. The hydrophobic pores of each layer comprise between about 75 percent to about 95 percent of the total pore volume, and the hydrophilic pores comprise about 25 percent to about 5 percent of the total pore volume of the porous support layers 40, 42. In a preferred embodiment, the porous support layers 40, 42 are also treated so that they include a wettability preserving compound taken from a group consisting of compounds that are wettable, have a low solubility, and that are stable within a working environment of known PEM fuel cells, such as oxides or hydroxides of aluminum, silicon, tin, niobium, ruthenium, tantalum, tungsten or mixtures thereof, with tin oxide being preferred.

Figure 3:
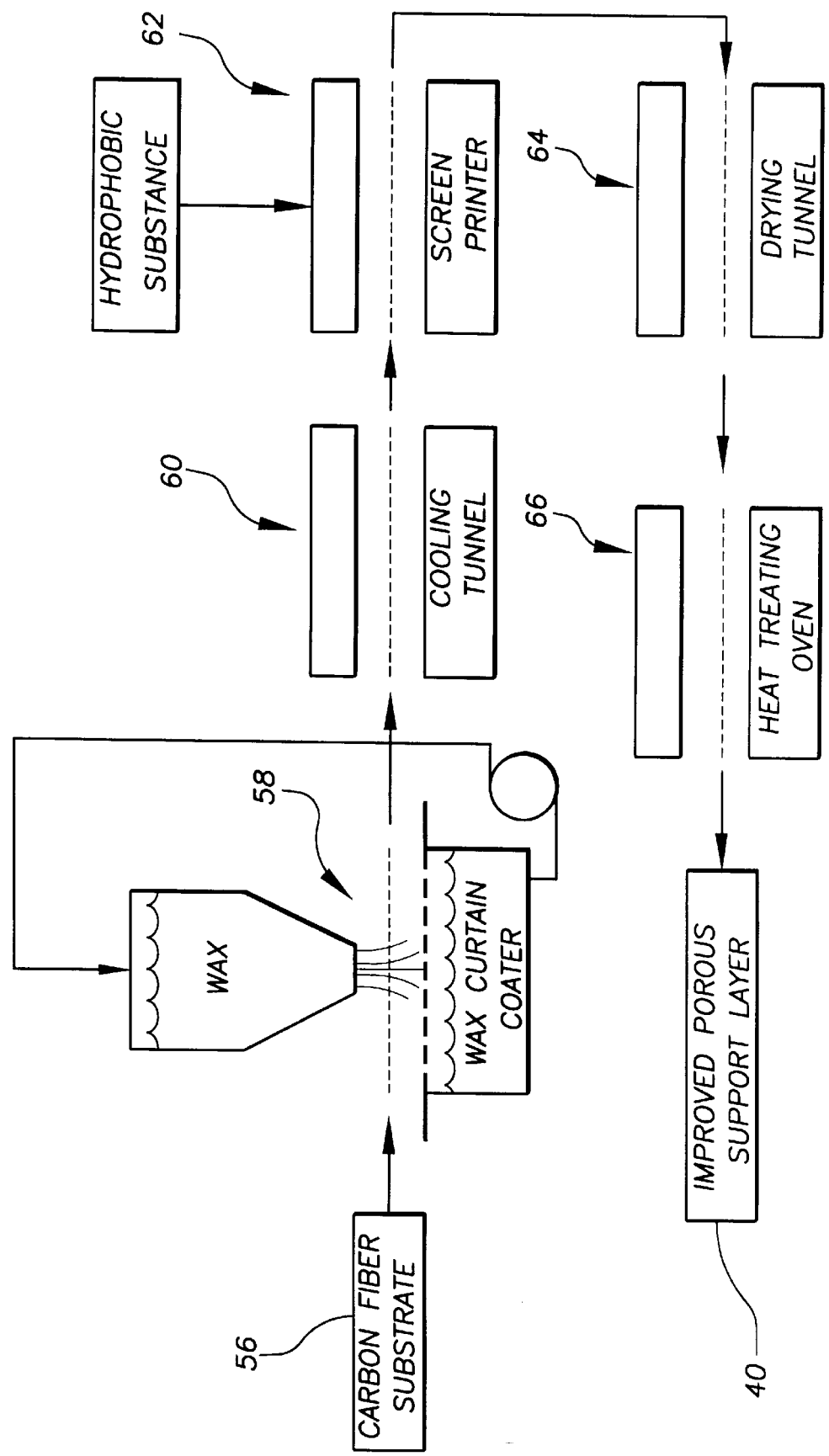
FIG. 3 is a schematic representation of a method of manufacture of the improved porous support layer of the present invention.

Manufacture of an improved porous support layer 40, 42 of the present invention includes treating a carbon fiber substrate having mean pore diameters and total pore volume appropriate for efficient transfer of fluids in an electrochemical cell such as the described fuel cell 10. Many such carbon fiber substrates are well-known in the art, and acceptable carbon fiber substrates must have mean pore diameters of about 10–60 microns and a total pore volume of about 60–80 percent of the substrate. A preferred example of such a porous carbon fiber substrate 56 is identified by the brand name "GRADE TGP-H-060", and made by the Toray Company of New York, N.Y., U.S.A., dimensioned to about 5–15 mils. in thickness with a total pore volume of about 65–75 percent. As shown in FIG. 3, manufacture of the improved porous support layers 40, 42 includes the steps of filling between about 5 to about 25 percent of the total pore volume of the carbon fiber substrate 56 with a blocking material such as wax; applying a hydrophobic substance to the unfilled pore volume of the substrate; and heat treating the substrate at a temperature adequately high to volatilize or decompose the blocking material and to fuse or sinter the hydrophobic substance to walls of the substrate defining the unfilled pores exposed to the hydrophobic substance. The blocking material may be any material that will block fluid absorption into the pores within which the blocking material resides during application of the hydrophobic substance and that will be removed from the pores such as by volatilization or decomposition during the heat treating step. Exemplary blocking materials include polymers such as polyvinyl alcohols, and various waxes well-known in manufacturing heat-treated substances. A preferred blocking material for the purposes recited herein is a wax sold under the brand name "MICROWAX 2575" by AKTOL, of Johannesburg, South Africa, which has a melting temperature of about 170 degrees fahrenheit ("°F."), and is optimally applied to the substrate at about 250° F. When the blocking material has been volatilized or decomposed during the heat treating process and hence removed from the substrate 56, the pores that were formerly filled with the wax become the hydrophilic pores, and the walls with fused hydrophobic substance define the hydrophobic pores.

As shown schematically in FIG. 3, a preferred method of manufacture of the improved porous support layers 40, 42 includes first filling a portion of the pore volume of the carbon fiber substrate 56 with a liquid blocking agent such as molten wax by passing the substrate 56 through a standard curtain coating device 58. Process parameters including a feed rate of the substrate through the curtain coater 58 and a flow rate of the molten wax onto the substrate are set so that a proportion of pore volume of the substrate occupied by the wax corresponds to a proportion of pore volume that is to become the hydrophilic pores. The next step is cooling the substrate 56 at a temperature less than a melting temperature of the wax for long enough to cool the wax below its melting point so that it becomes solid such as by passing the wax-filled substrate through a cooling tunnel 60. A hydrophobic substance is then applied in a well-known process for applying a thin layer of a liquid to a porous surface, such as by a screen printer 62. An appropriate hydrophobic substance is a hydrophobic polymer such as well-known "TEFLON" polymers sold by the DuPont Company of Willmington, Del., U.S.A. In particular, the suspension identified as "TEFLON-30" is an appropriate hydrophobic substance.

The next step is to dry the substrate at a temperature below the melting temperature of the wax for a period of time long enough to evaporate any water or liquid carrier for the hydrophobic substance, such as in a drying tunnel 64. Finally, the dried substrate is heat treated in an oven 66 at a temperature high enough to volatilize or decompose the wax and sinter or fuse the hydrophobic compound to the walls of the substrate defining the pores that were not filled with the wax.

A more specific application of the method of manufacture of a porous support layer 40, 42 of the present invention includes first treating a substrate 56 to include wettability preserving compounds. It is known that carbon structures in PEM cell working environments become hydrophobic in time, especially in the anode side of the cell, due to a reduction of carbon oxides. For example, a substrate comprising the above described Toray Company's "GRADE TGP-H-060" material being approximately 6 mil. thick with a total pore volume of about 0.0114 $cm^3/cm^2$ is treated to include the wettability preserving compound tin oxide. That is achieved by immersing the substrate layer 56 for about 15 minutes in a solution of tin tetrachloride pentahydrate dissolved in water to give a concentration of about 0.16 grams of tin oxide per cubic centimeter of water. The saturated substrate 56 is then immersed in a solution of ammonia maintained at a pH of between about 7 to 9 for about one hour. The substrate is then dried at 180° F. (degrees fahrenheit) for about 15 minutes and heated in air at a temperature of about 750° F. for about one hour. The porous substrate 56 layer then includes a wettability preserving compound of about 0.05 grams of tin oxide per gram of substrate layer. A preferred range of wettability preserving compound in the substrate is between about 0.01 to about 0.15 grams of wettability preserving compound per gram of substrate.

After treating the substrate 56 to include a wettability preserving compound, between about 5–25 percent of the total pore volume of the substrate is then filled or impregnated with a molten wax such as the above described AKTOL MICROWAX 2575 by passing the wettability treated substrate through the curtain coating device 58. The curtain coating device is set so that a curtain thickness of the molten wax and a feed rate of the substrate 56 correspond to applying an appropriate volume of wax per unit of surface area of the substrate to fill between about 5–25 percent of the total pore volume of the substrate between that unit of surface area and an opposed, equal size surface area. For example, to fill about 25 percent of above described 6.0 mil. thick Toray substrate layer with the above described AKTOL MICROWAX-2575, the wax is heated in the curtain coater 58 to about 250° F., and a feed rate of the substrate layer 56 through the curtain coater and the curtain thickness of molten wax applied to the substrate would simply be adjusted to result in a wax loading of about 0.40 grams of wax per gram of substrate 56. That rate or wax loading corresponds to about 0.0029 $cm^3$ of wax per $cm^2$ of substrate which is equal to about 25 percent of the void volume of the substrate. The substrate thereby impregnated with the AKTOL MICROWAX-2575 wax would then be cooled at less than 150° F. to solidify the wax, or if another molten blocking material is used, cooled at less than the melting temperature of the blocking material.

The wettability treated, wax impregnated substrate layer 56 then has a hydrophobic substance applied by the screen printer 62 using a screen printing ink made from the above described TEFLON-30 suspension. The screen printing ink is made by diluting the TEFLON-30 suspension with water to a concentration of about 0.20 grams of TEFLON-30 per $cm^3$ of water. The diluted suspension has its viscosity increased to between 10,000–20,000 centipoise by addition of a liquid carrier or thickening agent such as a product sold by the brand name "POLYOX WSR-301", manufactured by Union Carbide Company of New York, N.Y. U.S.A., in order to produce a suspension with acceptable viscosity for screen printing. The substrate 56 is then screen printed over one of its major planar surfaces by techniques well-known in the art with the described screen-printing ink. The printed substrate is then dried at about 160° F.–170° F. for about 15 minutes, and then heat treated at about 660° F. for about 5–30 minutes. The loading of the hydrophobic substance (in this example being the TEFLON-30) within the substrate would be about 0.36 grams of hydrophobic substance per gram of substrate 56. A preferred range of hydrophobic substance coating of the hydrophobic pores is between about 0.20 to about 0.60 grams of hydrophobic substance per gram of substrate 56.

Because in the described example about 25 percent of the total pore volume of the substrate would be impregnated with the solidified wax when the hydrophobic substance is screen printed onto the substrate, no hydrophobic substance would be located within the pores filled with the wax. During the heat treating step, the wax is volatilized so that the pores formerly filled with the wax then become the hydrophilic pores of the improved porous support layer 40, 42. The heat treating step also fuses the hydrophobic substance to surfaces of the substrate that define the pores not filled with the wax, and therefore those pores become the hydrophobic pores of the porous support layer 40, 42. As is apparent, by adjusting process parameters of application of the wax to the substrate 56, proportions of the total pore volume of the substrate impregnated with the wax may be varied to thereby set the proportion of hydrophilic pores in the resulting porous support layer from about 5 percent to about 25 percent of the total pore volume, and to thereby simultaneously vary the proportion of hydrophobic pores from between about 95 percent to about 75 percent.

In use of the improved porous support layers 40, 42 of the present invention, as shown in FIG. 2, the layers 40, 42 may be positioned between the anode electrode 36 and a supply of reducing fluid 12 and water 14, and/or between the cathode electrode and a supply of oxidant 18. The porous support layers 40, 42 may also serve as support layers for application of further fluid transport components such as are commonly referred to as "bi-layers" or "contact bi-layers", or the porous support layers 40, 42 may also have a layer of catalyst materials well-known in electrochemical cell art (such as platinum and alloys thereof) applied directly to their own planar surfaces. Additionally, the improved porous support layers 40, 42 may be laminated through application of pressure and heat in a well-known technique directly to the PEM.

Design parameters for a fuel cell to power a transport vehicle or other electricity using device 24 may mandate that the cell provide a power surge capacity to provide adequate power to facilitate sudden, short-term acceleration of the vehicle. Such a sudden electrical current demand could result in liquid water depletion at the anode electrode due to proton drag of water through the PEM and a simultaneous liquid water flooding at the cathode electrode as excess water is both dragged to and formed at the cathode electrode in response to the increased current output. Use of the improved porous support layers 40, 42 in a cell facing such a demand will result in both an enhanced capacity of the cell to provide liquid water to the anode electrode, as well as an enhanced capacity to remove liquid water from the cathode electrode. Moreover, the improved porous support layers 40, 42 may be structured to have the proportion of hydrophilic pores adjusted during manufacture from between 5 to 25 percent of the total pore volume of the porous support layer, while the hydrophobic pores are correspondingly adjusted from 95 to 75 percent of the total pore volume of the support layer in order to specifically set the improved porous support layers to resolve fluid transport problems anticipated by specific power surge demands of a specific transport vehicle. For example, the power surge demands of a light-weight vehicle may vary significantly from demands of a heavy vehicle. Proportions of hydrophilic and hydrophobic pores of the improved porous support layers 40, 42 may be structured during manufacture to be within appropriate ranges to best satisfy demands of a specific vehicle.

While the present invention has been described and illustrated with respect to a particular construction and method of manufacture of an improved porous support layer for use in a fuel cell, it will be understood by those skilled in the art that the present invention is not limited to the described and illustrated examples. For example, FIG. 2 shows the first porous support layer 40 directly adjacent the anode electrode 36 of a fuel cell 10, and the second porous support layer 42 directly adjacent the cathode electrode 38 of the fuel cell 10. The improved porous support layers 40, 42 however may be positioned anywhere within fluid communication with an electrode of an electrochemical cell that will facilitate simultaneous gaseous and liquid transport within the cell. Additionally, only one improved porous support layer 40 may be utilized in an electrochemical cell. Accordingly, reference should be made primarily to the attached claims rather than the foregoing description to determine the scope of the invention.

What is claimed is:

1. A porous support layer for facilitating simultaneous transport of gaseous and liquid fluids within an electrochemical cell, comprising a carbon fiber substrate having mean pore diameters of about 10 microns to about 60 microns, and having a total pore volume of about 60–80 percent, the substrate having about 75 percent to about 95 percent of the total pore volume defining hydrophobic pores coated with a hydrophobic substance and having about 25 percent to about 5 percent of the total pore volume defining hydrophilic pores, wherein the hydrophobic and hydrophilic pores are integrated throughout the substrate.

2. The porous support layer of claim 1, wherein the hydrophobic pores are coated with about 0.20 to about 0.60 grams of hydrophobic substance per gram of substrate.

3. The porous support layer of claim 2, wherein the carbon fiber substrate includes about 0.01 to about 0.15 grams of a wettability preserving compound per gram of substrate.

4. The porous support layer of claim 1, wherein the hydrophobic pores are coated with about 0.36 grams of hydrophobic substance per gram of substrate.

5. The porous support layer of claim 1, wherein the carbon fiber substrate includes a wettability preserving compound.

6. The porous support layer of claim 5, wherein the wettability preserving compound is taken from the group consisting of oxides or hydroxides of aluminum, silicon, tin, niobium, ruthenium, tantalum, tungsten or mixtures thereof.

7. The porous support layer of claim 6, wherein the carbon fiber substrate includes about 0.01 to about 0.15 grams of the wettability preserving compound per gram of substrate.

8. A method of manufacture of a porous support layer for facilitating simultaneous transport of gaseous and liquid fluids within an electrochemical cell, comprising the steps of:
   a. providing a carbon fiber substrate having mean pore diameters of about 10 microns to about 60 microns, and having a total pore volume of about 60–80 percent;
   b. filling about 5 to about 25 percent of the total pore volume of the substrate with a blocking material;
   c. applying a hydrophobic substance to the unfilled pore volume of the substrate; and
   d. heat treating the substrate at a temperature adequately high to remove the blocking material and adequately high to fuse the hydrophobic substance to walls of the substrate defining the pores unfilled with the blocking material so that those pores with the fused hydrophobic substance become hydrophobic pores and the pores with the removed blocking material become hydrophilic pores.

9. The method of claim 8, wherein the step of filling the about 5 to about 25 percent of the total pore volume of the substrate with a blocking material further comprises filling the about 5 to about 25 percent of the total pore volume with a wax.

10. The method of claim 8 further comprising, after the providing a carbon fiber substrate step, treating the carbon fiber substrate with a wettability preserving compound so that the carbon fiber substrate includes about 0.01 to about 0.15 grams of the wettability preserving compound per gram of substrate.

11. The method of claim 8 wherein the step of applying a hydrophobic substance to the unfilled pore volume of the substrate further comprises applying the hydrophobic substance so that the hydrophobic pores are coated with about 0.20 to about 0.60 grams of hydrophobic substance per gram of substrate.

12. A method of manufacture of a porous support layer for facilitating simultaneous transport of gaseous and liquid fluids within an electrochemical cell, comprising the steps of:
   a. providing a carbon fiber substrate having mean pore diameters of about 10 microns to about 60 microns, and having a total pore volume of about 60–80 percent;
   b. filling about 5 to about 25 percent of the total pore volume of the substrate with a liquid blocking material;
   c. cooling the substrate at a temperature less than a melting temperature of the liquid blocking material for a period of time long enough to solidify the blocking material within the about 5 to about 25 percent of the total pore volume;
   d. applying a hydrophobic substance to the unfilled pore volume of the substrate;
   e. drying the substrate at a temperature below the melting temperature of the blocking material for a period of time long enough to evaporate any water or liquid carrier applied with the hydrophobic substance; and
   f. heat treating the substrate at a temperature adequately high to remove the blocking material and adequately high to fuse the hydrophobic substance to walls of the substrate defining the pores unfilled with the blocking material so that those pores with the fused hydrophobic substance become hydrophobic pores and the pores with the removed blocking material become hydrophilic pores.

13. The method of claim 12, wherein the filling step further comprises passing the substrate through a curtain coating device adjusted so that a curtain thickness of the liquid blocking material and a feed rate of the substrate through the device correspond to applying an appropriate volume of wax to fill between the about 5 to about 25 percent of the total pore volume of the substrate as the substrate passes through the device.

14. The method of claim 12, further comprising, after the providing a carbon fiber substrate step, treating the carbon fiber substrate with a wettability preserving compound so that the carbon fiber substrate includes about 0.01 to about 0.15 grams of the wettability preserving compound per gram of substrate.

15. The method of claim 12, wherein the step of applying a hydrophobic substance to the unfilled pore volume of the substrate further comprises applying the hydrophobic substance so that the hydrophobic pores are coated with about 0.20 to about 0.60 grams of hydrophobic substance per gram of substrate.

16. The method of claim 12, wherein the step of applying the hydrophobic substance to the unfilled pore volume of the substrate further comprises screen printing the hydrophobic substance into the unfilled pore volume of the substrate.

* * * * *